(12) United States Patent
Ebisawa et al.

(10) Patent No.: US 12,439,144 B2
(45) Date of Patent: Oct. 7, 2025

(54) IMAGE ACQUISITION APPARATUS, IMAGE ACQUISITION METHOD, AND MEDIUM

(71) Applicant: CANON KABUSHIKI KAISHA, Tokyo (JP)

(72) Inventors: Hisafumi Ebisawa, Tokyo (JP); Yoshikatsu Ichimura, Tokyo (JP); Ichiro Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 18/486,200

(22) Filed: Oct. 13, 2023

(65) Prior Publication Data

US 2024/0137637 A1  Apr. 25, 2024
US 2024/0236467 A9  Jul. 11, 2024

(30) Foreign Application Priority Data

Oct. 19, 2022  (JP) .................................. 2022-167781

(51) Int. Cl.
| | |
|---|---|
| *H04N 23/56* | (2023.01) |
| *G02B 13/22* | (2006.01) |
| *H04N 5/265* | (2006.01) |
| *H04N 23/80* | (2023.01) |

(52) U.S. Cl.
CPC ............ *H04N 23/56* (2023.01); *G02B 13/22* (2013.01); *H04N 5/265* (2013.01); *H04N 23/80* (2023.01)

(58) Field of Classification Search
None
See application file for complete search history.

(56) References Cited

U.S. PATENT DOCUMENTS

| | | | |
|---|---|---|---|
| 5,952,562 A | 9/1999 | Yagi et al. | |
| 7,612,569 B2 | 11/2009 | Ushijima et al. | |
| 8,462,328 B2* | 6/2013 | Fisch | G01N 21/8806 356/394 |
| 2004/0075882 A1* | 4/2004 | Meisburger | G03F 7/70508 359/290 |
| 2011/0121199 A1* | 5/2011 | Tanikawa | G01J 3/4406 250/208.1 |
| 2019/0101736 A1* | 4/2019 | Chen | H04N 23/811 |
| 2022/0342195 A1* | 10/2022 | Liao | G02B 21/248 |
| 2023/0355142 A1* | 11/2023 | Yamakawa | G01N 21/3577 |
| 2024/0077412 A1* | 3/2024 | Kano | G01N 21/31 |

FOREIGN PATENT DOCUMENTS

| | | |
|---|---|---|
| JP | 4936867 B2 | 5/2012 |
| JP | 2013-041142 A | 2/2013 |
| JP | 2020-188717 A | 11/2020 |

* cited by examiner

*Primary Examiner* — Cynthia Segura
(74) *Attorney, Agent, or Firm* — Venable LLP

(57) ABSTRACT

An apparatus acquiring an image of a subject of a phase object includes: a first light irradiation unit irradiating the subject with a parallel light as a first light; a second light irradiation unit irradiating the subject with a second light at an incidence angle different from that of the first light irradiation unit; an imaging lens having a telecentric optical system; and an imaging unit which images the subject irradiated with at least one of the first light and the second light through the imaging lens, wherein the optical axis of the imaging lens is parallel to an optical path of the first light irradiation unit, the imaging unit is arranged on the optical axis opposite to the first light irradiation unit to the subject, and an optical path length adjusting unit controlling the distance between the telecentric optical system and the subject on the optical axis is arranged.

16 Claims, 7 Drawing Sheets

IMAGE ACQUISITION APPARATUS, IMAGE ACQUISITION METHOD, AND MEDIUM

BACKGROUND OF THE INVENTION

Field of the Invention

The disclosure related to an image acquisition apparatus, an image acquisition method, and a medium.

Description of the Related Art

In order to evaluate the characteristics of a cell, it is important to obtain the morphology of the cell and the chemical and physical properties (optical properties such as fluorescence) other than the morphology from the cell. Since the morphology of a cell which is a transparent phase object cannot be visualized by ordinary bright field optical systems, phase-contrast microscopy is widely used to execute a characteristic evaluation of the cell. More specifically, a phase contrast microscope with a ring slit in the transillumination unit and a phase plate in the objective lens is used. In the document of Japanese Patent No. 4936867, a system capable of acquiring a morphological image and fluorescence characteristics by combining an excitation light irradiation unit in epi-illumination and a fluorescence filter with the phase-contrast microscope is disclosed.

In the phase contrast microscope disclosed in the document of Japanese Patent No. 4936867, since phase contrast observation and fluorescence observation are performed with the same objective lens, the superposition of images obtained by both observations can be realized with high accuracy. However, it is necessary to arrange the ring slit and the phase plate. There are also restrictions on the lens to be used to realize the phase difference observation.

SUMMARY OF THE INVENTION

An embodiment of the present disclosure is made in view of the above problems. One of the purposes of the present disclosure is to enable the characteristic evaluation of a phase object by a simpler configuration without the ring slit or the phase plate.

For dealing with the above described matter, an image acquisition apparatus according to one aspect of the present disclosure is to acquire an image of a subject which is a phase object, comprising:
- a first light irradiation unit configured to irradiate the subject with a parallel light which is a first light;
- a second light irradiation unit configured to irradiate the subject with a second light at an incident angle different from that of the first light irradiation unit;
- an imaging lens comprising a telecentric optical system; and
- an imaging unit using the imaging lens, configured to image the subject to which at least one of the first light and the second light is irradiated,
  wherein an optical axis of the imaging lens is parallel to an optical path of the first light irradiation unit,
  the imaging unit is disposed opposite to the first light irradiation unit with respect to the subject, on the optical axis, and
  an optical path length adjusting unit configured to controlling a distance between the telecentric optical system and the subject, on the optical axis, is provided.

Further features of the present invention will become apparent from the following description of exemplary embodiments with reference to the attached drawings.

DESCRIPTION OF THE EMBODIMENTS

Figure 1:
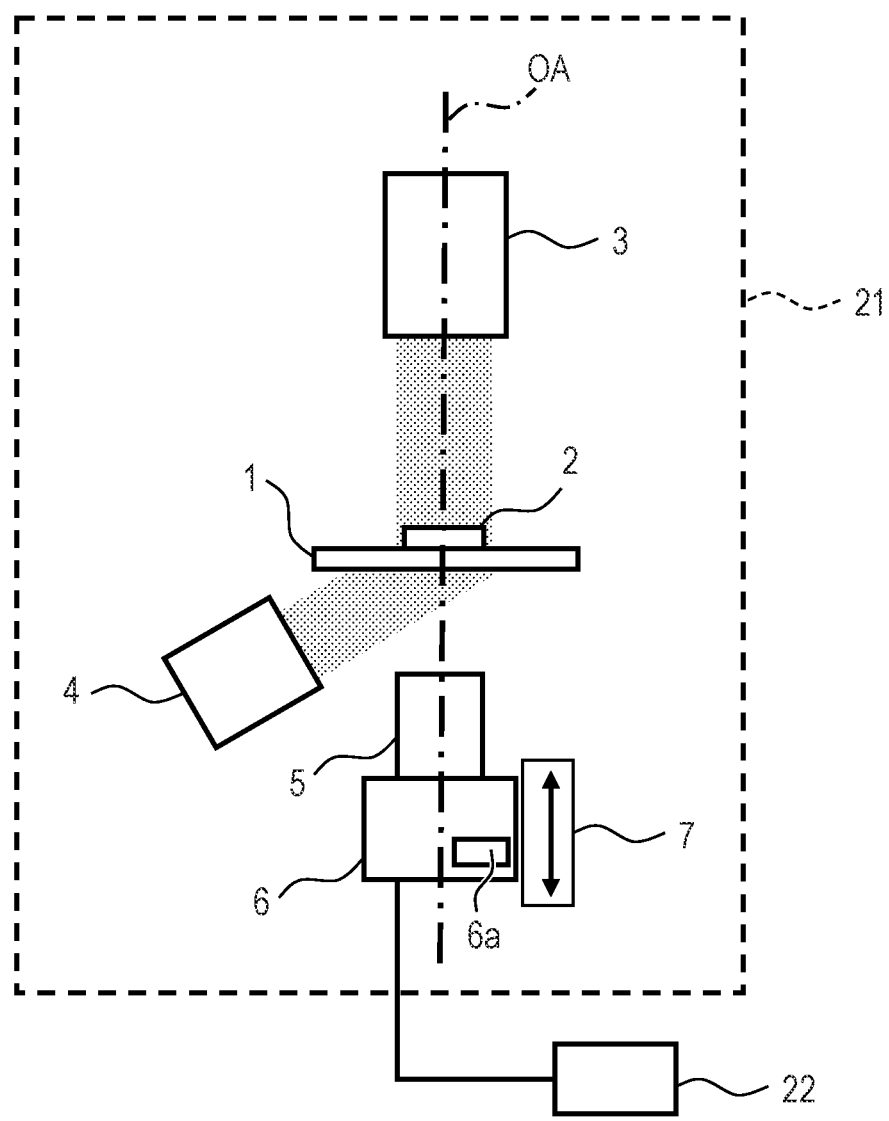
FIG. 1 shows a schematic configuration of an image acquisition apparatus according to an embodiment of the present disclosure.

A preferred embodiment of the present disclosure will now be described with reference to the drawings. However, the dimensions, materials, shapes, relative positions of components, etc. as illustrated in the following embodiments are optional and can be modified depending on the configuration or various conditions of the apparatus to which the present disclosure applies. Also, in the drawings, the same reference numerals are used between drawings to indicate elements that are identical or functionally similar. In the embodiments of the present disclosure, terms of a parallel light and a parallel may be lights substantially in parallel to each other (substantially parallel light) or substantially parallel in a range in which the effects of the present disclosure can be obtained.

Even in an optical system in which the ring slit and the phase plate are not used, the presence of a transparent phase object can be confirmed by irradiating the optical system with collimated light and shifting the focus from the focal position (defocusing). Therefore, even in an optical system in which the phase plate is not included, for example, a lens for a commercially available digital camera, a presence of the transparent phase object can be confirmed by preparing an appropriate irradiation light. The present disclosure described below is based on a knowledge that not only the presence of a minute transparent phase object such as a cell but also morphological information can be acquired by digitally zooming a captured image data using a digital camera having a high pixel image pickup element in an imaging system.

In addition, by using a telecentric lens, for example, a bilateral telecentric lens, as the imaging lens, it is possible to suppress the size change due to defocus. Therefore, if a telecentric lens is used as the imaging lens for an image acquisition apparatus exemplified by a digital camera using collimated light, the form of the transparent phase object can be visualized without the size change. In the document of Japanese Patent No. 4936867, the presence of the minute and transparent phase object such as a cell is confirmed by using a high-magnification objective lens such as a microscope. However, the presence of the transparent phase object can be confirmed by using the telecentric lens even when digitally zooming the image captured by using a digital camera equipped with a high pixel image pickup element. In the embodiment according to the present disclosure, the transparent phase object can be confirmed by irradiating a subject with collimated light, using the telecentric lens as the imaging lens, and obtaining the image in a defocused state based on the above knowledge.

However, the collimated light irradiation system adjusted to the defocus position can only confirm the presence of the transparent phase object or obtain morphological information, which is insufficient for a cell characteristic evaluation. Therefore, in the present disclosure, the cells are irradiated with excitation light to obtain fluorescence characteristics, and fluorescence images are obtained in the in-focus state. Then, the image acquired in the in-focus state obtained by changing the optical path length of the imaging lens by movement or the like of the imaging lens on the optical axis is combined with the image obtained in the defocus state, thereby enabling the characteristic evaluation of the cells as transparent phase objects.

In other words, in the image acquisition apparatus according to the present disclosure, the transparent phase object is irradiated with transmitted light as the substantially collimated light in the vertical direction and is irradiated with the light in other directions to acquire the image of the transparent phase objects via a telecentric optical system. In addition, by using the telecentric optical system, the cell characteristic evaluation is performed on the fluorescence image obtained in the in-focus state, and the confirmation of the presence of transparent phase objects or morphological information thereof is performed on the image obtained in the defocus state. Hereinafter, an example of a specific image acquisition apparatus of the present disclosure will be described with reference to FIG. 1 showing a schematic configuration thereof (Configuration of Image Acquisition Devices)

An image acquisition apparatus 100 according to an embodiment of the present disclosure comprises an image acquisition unit 21 and an image processing unit 22. The image acquisition unit 21 also comprises an installation table 1, a first light irradiation unit 3, a second light irradiation unit 4, an imaging lens 5, an imaging unit 6, and an optical path length adjusting unit 7, which will be described later. The image processing unit 22 may be composed of, for example, a personal computer (PC) or a tablet terminal, and may be communicatively connected to the image acquisition unit 21 or a storage device (not shown) in which the image acquisition unit 21 stores a previously acquired image. The image processing unit 22 may acquire images transmitted from the connected image acquisition unit 21 or the storage device, and perform compose or synthesis processing or the like, which will be described later, on these images.

The installation table 1 is used when installing a subject 2 to be observed. The subject 2 is located between the imaging unit 6 (and the imaging lens 5) and the first light irradiation unit 3 on the imaging optical axis OA of the imaging unit 6. The first light irradiation unit 3 irradiates the subject 2 with substantially collimated (parallel) light. The second light irradiation unit 4 irradiates the subject 2 with light at an incident angle different from that of the first light irradiation unit 3. The first light irradiation unit 3 irradiates the upper side (first side) of the subject 2 located on the installation table 1, and the second light irradiation unit 4 irradiates the lower side (second side opposite to the first side) of the subject 2 located on the installation table 1 through the installation table 1. The imaging lens 5 includes a telecentric optical system. An example of the telecentric optical system is a telecentric lens. When the telecentric lens is used as an imaging lens, it may be referred to as an imaging telecentric lens in the following.

The imaging unit 6 acquires information of the subject 2 irradiated with light by the first light irradiation unit 3 and the second light irradiation unit 4. The imaging unit 6 receives the transmitted light irradiated by the first light irradiation unit 3 (transillumination) and transmitted through the subject 2. The imaging unit 6 receives the epi-illumination light irradiated by the second light irradiation unit 4 (epi-illumination) and reflected by the subject 2. The optical path length adjusting unit 7 changes the optical path length between the subject 2 and the imaging lens 5. In the present disclosure, the imaging unit 6 has an imaging control unit 6a. As described later, the imaging unit 6 can acquire, for example, a defocus image obtained by irradiating light of the first light irradiation unit 3 and an in-focus image obtained by irradiating light of the second light irradiation unit 4, and these images can be transmitted to the image processing unit 22. Based on the focus state obtained based on the defocus image and the in-focus image, the imaging control unit 6a operates, for example, the optical path length adjusting unit 7 to adjust the optical path length described above.

It is preferable that the entirety of the image acquisition unit 21 is covered with a housing so that light does not enter from the outside. However, it is necessary to have a door that opens and closes when installing the subject 2 on the installation table 1.

In addition, since vibration during imaging can cause a change in the position of the subject 2 and deterioration of the image, it is preferable that the entirety of the image acquisition unit 21 be provided with a vibration countermeasure. For example, it is preferable that a rubber or an air spring for vibration removal be installed at the lower part of the entire of the image acquisition unit 21.

In FIG. 1, an inverted type image acquisition apparatus is illustrated, but the form of the image acquisition apparatus to which the present disclosure applies is not limited to the example of FIG. 1, and can also be used in an upright type image acquisition apparatus in which the vertical positional relationship is inverted. In addition, although the image acquisition unit 21 and the image processing unit 22 are formed separately, they may be integrated, and if necessary, the imaging control unit 6a may be included in a PC including the image processing unit 22. The configuration of each of the image acquisition units described above will be described below.

(Subject)

In the present disclosure, a transparent phase object is exemplified as the subject 2 to be observed. When the phase object is a cell, the subject 2 is a liquid and a cell enclosed in a transparent container. In this case, a petri dish or the like made of commercially available glass or polystyrene or the like is used as the container. In addition, a liquid for maintaining cells during cell culture such as a medium or PBS (Dulbecco's Phosphate Buffered Saline) or a liquid for preventing drying of immobilized cells is used as the liquid. It should be noted that the container needs to be optically transparent on the light irradiation side and the imaging unit side, but other side surfaces, for example, need not be transparent.

The installation table 1 is arranged for installing the subject 2, and a side of the installation table 1 facing the imaging unit 6 and a side of the installation table 1 facing the first light irradiation unit 3 need to be optically transparent. Specifically, in the case of an inverted image acquisition apparatus as shown in FIG. 1, for example, it is preferable that the imaging area has a hole penetrating from the side of the installation table 1 facing the imaging unit 6 to the side of the installation table 1 facing the first light irradiation unit 3. In addition, it is also preferable that a fixing jig is provided so that the above-mentioned container does not move from an installed position on the installation table 1 under a slight impact.

Since there are various shapes of the container such as a circular petri dish or a rectangular multi-well plate, it is preferable that the attachment and the fixing jig can be changed to match these sizes.

In addition, the imaging position can be changed by mounting the installation table 1 on the two-axis XY stage. Thus, when the object to be observed is a multi-well plate, imaging of different wells is also possible. Note that the imaging position may be changed by moving the first light irradiation unit 3, the second light irradiation unit 4, the imaging lens 5, and the imaging unit 6 without moving the installation table 1. It is preferable that the scanning surfaces of the installation table 1 and the XY stage are not inclined so as to be perpendicular to the optical axis (OA) of the imaging unit 6 and the imaging lens 5.

(First Light Irradiation Unit)

The first light irradiation unit 3 irradiates the subject 2 with substantially collimated (parallel) light. More specifically, the first light irradiation unit 3 comprises a radiation source like a point light source and a collimator for changing the light from the radiation source into parallel light. Preferably, the light irradiated from the first light irradiation unit 3 to the subject is uniform, that is, the variation of the intensity of the irradiated light is small. The optical path of the light irradiated from the first light irradiation unit and an optical axis of the imaging lens to be described later are parallel.

As a technique to obtain a point light source as the radiation light source, a pinhole is provided in front of the light source. It is also effective to use the light emitted from the exit end of the bundle fiber which takes in the light from the light source as the point light source. Convex lenses, telecentric lenses, and the like can be used as collimators for making the light from the radiation source parallel light. It should be noted that the irradiation light used in the optical system exemplified here has a uniform light intensity distribution on the subject, and an image in which intensity unevenness is suppressed can be obtained. However, the application of the present disclosure is not limited to the example described here, and collimated light with uneven intensity may be irradiated, and even in this case, visualization of the phase object can be realized. Further, the first light irradiation unit 3 is not limited to the embodiment illustrated here if parallel light can be formed.

The optical axis of the parallel light emitted from the first light irradiation unit 3 is arranged so as to be parallel to the optical axis OA of the imaging unit 6 and the imaging lens 5. Therefore, in the case of the illustrated inverted imaging system, it is preferable that the first light irradiation unit 3 irradiates the subject 2 with light from the vertical upper side. In addition, it is preferable that the degree of parallelism between the optical axes of the imaging unit 6 and the imaging lens 5 is smaller than the maximum spread angle of the imaging telecentric lens used for the imaging lens 5. The imaging lens 5 may be a low-magnification lens.

In addition, in the first light irradiation unit 3 described above, a collimator is used to obtain substantially parallel light, but a collimator may not be used if substantially parallel light can be produced. For example, in the case of a radiation source like a point light source, if the distance from the light source to the subject 2 is made longer and the imaging range on the subject 2 is narrowed, the light used for imaging approaches substantially parallel. In practice, if the incident angle of the light irradiated in the imaging range with respect to the imaging optical axis OA of the imaging unit 6 is smaller than the maximum spread angle of the imaging telecentric lens, the effect similar to that of using a collimator can be expected. That is, in the present disclosure, substantially parallel light indicates light obtained by using a collimator and light with an effect similar to that of using a collimator. In addition, although white light may be used as the light source wavelength of the first light irradiation unit, an LED emitting a specific wavelength may be used to avoid blurring caused by chromatic aberration.

Although the light from the light irradiation unit 3 is irradiated in the vertical direction in FIG. 1, the light may be irradiated in the horizontal direction and reflected on a mirror tilted at 45 degrees to irradiate the subject 2 in the vertical direction. Thus, the size of the image acquisition unit 21 in the vertical direction can be reduced.

As a specific light source, a white light source such as an LED (Light Emitting Diode) light source or a halogen light source can be used. The wavelength band of the illumination light emitted from the light source causes blurring due to chromatic aberration of the diffracted light. Therefore, in order to obtain an image with a high contrast, it is preferable to use a narrow LED light source with a narrow wavelength region width to be emitted, or to use various filters such as a bandpass filter for an LED white light source with a wide wavelength region width to be emitted.

(Imaging Unit and Imaging Telecentric Lens)

The imaging unit 6 acquires optical information of the subject 2, and the image processing unit 22 images the optical information transmitted from the imaging unit 6. In the present disclosure, the imaging unit 6 may use, for example, a digital camera with a CCD and a CMOS sensor mounted as the imaging element. In this case, it is preferable that the number of pixels of the imaging element is large, and the larger the number of pixels, the higher the resolving power of the subject 2 by digital zoom, and the better the ability to depict the form of the minute subject such as a cell.

It is more preferable that the imaging telecentric lens used for the imaging lens 5 is a two-sided telecentric lens. In the present disclosure, a telecentric lens is used for the imaging lens 5, and the following three effects can be obtained because the principal ray of the telecentric lens is parallel to the optical axis.

As the first effect, the size of the subject in the defocus state hardly changes. In the case of a non-telecentric lens, the effect of defocus causes the size change of the angle of view in addition to the blurring of the contour. In contrast, in the case of a telecentric lens without an angle of view, the size does not change.

As a second effect, the unevenness of the transillumination is suppressed. When a lens having a large angle of view is used instead of a telecentric lens for imaging, the longer the distance between the first light irradiation unit 3 and the imaging lens 5, the smaller the area of the light irradiation unit occupied in the angle of view. Therefore, in order to obtain an image in which the entire imaging area is bright, a larger light irradiation unit is required. On the other hand, in the case of a telecentric lens, the area of the light irradiation unit occupied in the angle of view does not change even when the distance increases. Therefore, if the size of the first light irradiation unit 3 is equal to or larger than the imaging area, a bright image can be acquired in all areas regardless of the distance between the light irradiation unit and the lens.

As a third effect, a uniform image can be acquired in the imaging plane. When a telecentric lens is used, the light incident on the imaging element is limited to the components from the subject on the principal optical axis because the main light ray is parallel to the lens optical axis. Therefore, if uniform illumination light is incident on the imaging region, the relative evaluation of the subject in the plane can be realized by the output value of the imaging data.

It is preferable that the image generated by the image processing unit 22 can be immediately confirmed by the operator in order to confirm the imaging area and image quality. Accordingly, the image processing unit 22 is preferably connected to a monitor (not shown) for displaying the generated image information.

In addition, it is preferable that the imaging unit and the imaging telecentric lens can be appropriately replaced according to the type of the subject 2 and the measurement content.

(Second Light Irradiation Unit)

The second light irradiation unit irradiates the subject 2 with light in an angle different from that of the first light irradiation unit, and can be used to obtain the fluorescence characteristic of the subject 2 by irradiating with the excitation light. When obtaining the fluorescence characteristic of the subject 2, the excitation light is irradiated with an epi-illumination to obtain the fluorescence information in order to improve the signal-to-noise ratio of the image. In this case, as shown in FIG. 1, for example, it is preferable to irradiate the subject 2 with the excitation light obliquely from the imaging unit 6 side. It is preferable that the light irradiated from the second light irradiation unit to the subject is uniform, that is, the variation of the intensity of the irradiated light is small.

Figure 7:
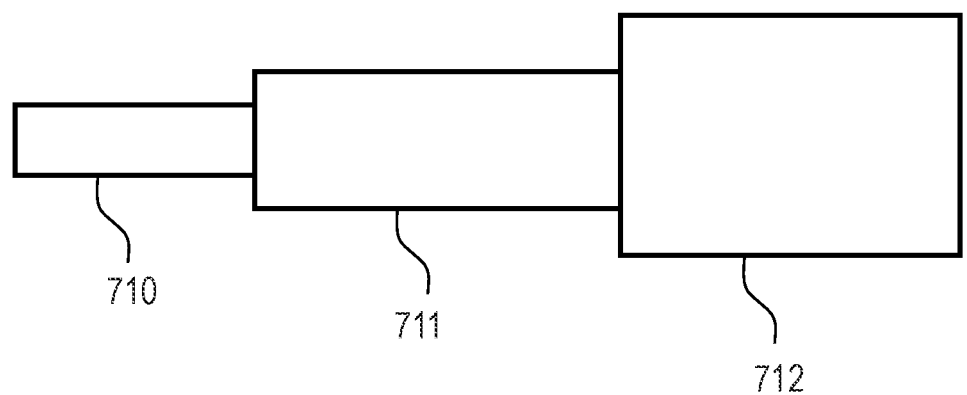
FIG. 7 is a diagram showing an example of a second light irradiation unit according to the embodiment of the present disclosure.

In the case of substantially collimated light in which the irradiated light is uniform, the amount of light on the irradiated surface irradiated from an oblique angle becomes uniform, which is effective for image homogenization and relative evaluation in the screen. In the case of obtaining such uniform substantially collimated light, it can be realized by irradiating the collimator with uniform light. Convex or telecentric lenses can be used for the collimator. Incoming uniform light can be achieved by passing light from the light source through a diffuser or bundle fiber. In addition, a rod lens that emits uniform light by repeating the reflection of incident light inside a polygonal cylinder, such as a kaleidoscope, is also effective. It is also effective to use a combination of these. FIG. 7 shows an example of a second light irradiation unit in which a light guide 710, a rod lens 711, and a telecentric lens 712 are combined. A bundle fiber is preferably used for the light guide 710. When the rod lens is used, it is necessary to adjust the focus position so that the subject is in the focus position. In addition, for uniform light, the light quantity distribution in the observation area is smooth, which means that there is no vertical change. When performing fluorescence imaging, it is necessary to install a filter (for fluorescence but not shown) between the subject 2 and the imaging unit 6 to remove the excitation light and transmit only fluorescence.

As the excitation light, a wavelength corresponding to the excitation characteristics such as a fluorescent label is selected, and if the light source emits light of that wavelength, the type of the light source is not limited. A light source that emits white light, for example, a light source that combines a mercury lamp and an excitation filter (a filter that transmits light of a specific wavelength), can also be used. The filter (for fluorescence) must also be selected based on the balance between the fluorescence wavelength of the light from the subject 2 and the excitation light wavelength. Preferably, the excitation light and the filter (for fluorescence) can be easily exchanged.

When the cell or the like, which is the subject 2, is contained in a container exemplified by a petri dish, the oblique epi-illumination light may cause stray light by irradiating the container wall surface. In order to reduce the stray light, it is preferable to make the excitation light enter the telecentric lens from the side surface, and realize the coaxial epi-illumination through an optical path changing member such as a dichroic mirror installed in the telecentric lens.

Figure 2:
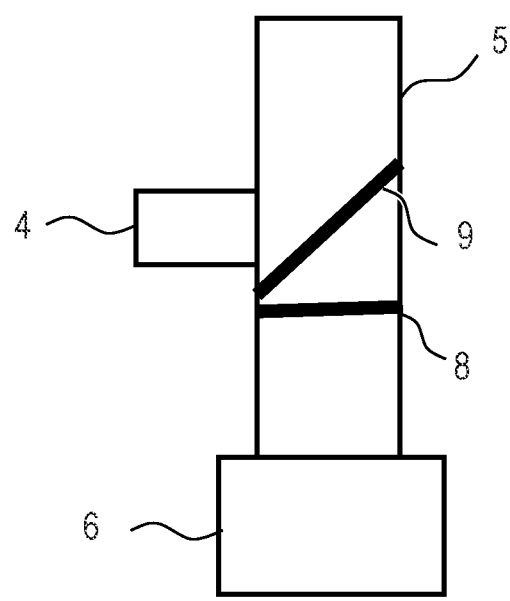
FIG. 2 shows a schematic configuration of an imaging telecentric lens when a light from a second light irradiation unit is coaxial epi-illumination.

FIG. 2 shows a schematic configuration of an example of an optical system for realizing the incidence of the excitation light. In the example shown in FIG. 2, the second light irradiation unit 4 is fixed to a side surface of the telecentric lens which is the imaging lens 5, and the excitation light is directly incident into the telecentric lens. A dichroic mirror 9 is arranged in the telecentric lens. The excitation light is reflected by the dichroic mirror 9 and irradiated to the subject 2 from the telecentric lens along the optical axis parallel to the imaging optical axis OA of the imaging unit 6. In this configuration, in order to remove the reflected light generated by the excitation light from the subject 2, it is necessary to provide a filter 8 at a position immediately before imaging, through which the excitation light does not pass but only passes fluorescence.

Figure 3:
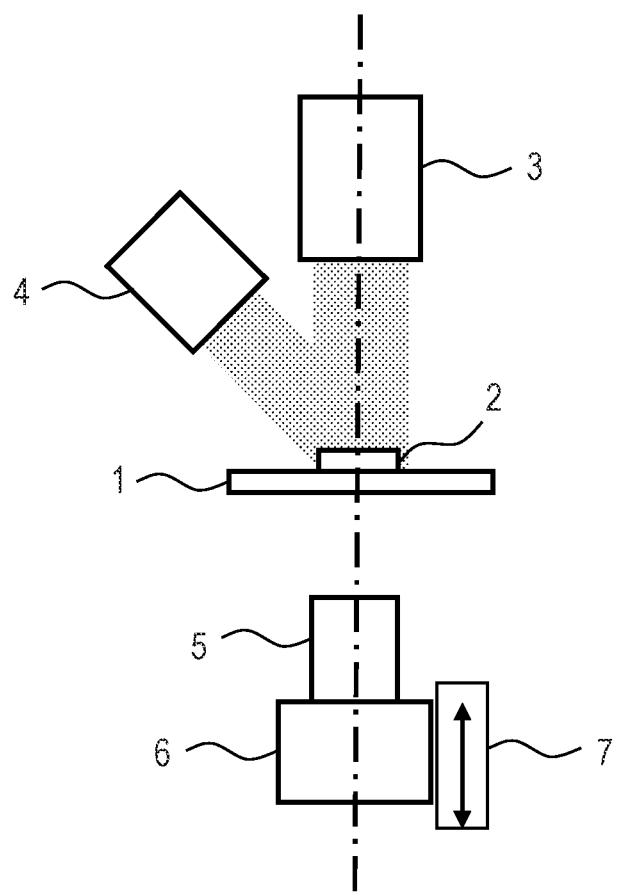
FIG. 3 shows a schematic configuration in which the second light irradiation unit is provided on the transillumination side.

In addition, by using the second light irradiation unit 4, it is possible to obtain characteristics of the subject 2 in addition to the fluorescence characteristics. An example of an image acquisition apparatus for obtaining characteristics other than the fluorescence characteristics will be described with reference to the schematic diagram of FIG. 3. In the example shown in FIG. 3, the second light irradiation unit 4 is configured to irradiate the imaging unit 6 with light from a rear surface side of the subject 2. In this manner, in the form of irradiating the light from the rear surface side of the subject 2, a dark-field illumination image is obtained when the light is irradiated at a maximum spread angle or greater, and a polarized illumination image is obtained when the light is irradiated at an angle less than a maximum spread angle with respect to the optical axis of the imaging telecentric lens which is the imaging lens 5.

In this example, a telecentric lens is used as the imaging lens 5. However, an optical system for obtaining the same effect as the telecentric lens can be provided from a plurality of optical members and arranged at the position of the imaging lens. By using such a configuration, although the configuration may be complicated, the degree of freedom in design is increased with respect to the arrangement of the dichroic mirror. In the present disclosure, telecentric optical systems include aspects of these optical systems and aspects of telecentric lenses.

(Optical Path Length Adjusting Unit)

Figure 4:
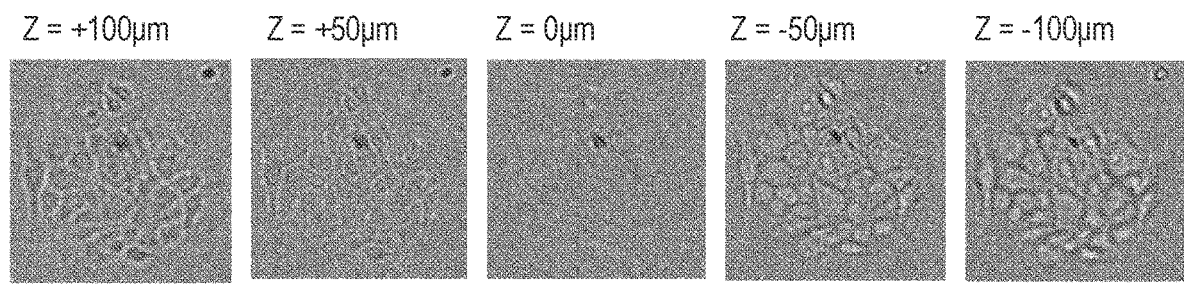
FIG. 4 shows an example of a defocus image in which the cell shape obtained in the above embodiment can be confirmed.

Even if substantially collimated light is incident from the first light irradiation unit 3 in parallel with the optical axis of the imaging telecentric lens (imaging lens 5) and the subject 2 is imaged at the focus position of the imaging lens 5, the cell which is a transparent phase object is not visualized. However, the transparent cell is depicted by defocusing slightly from the focus position. An example of an image obtained by imaging the transparent phase object by changing the defocus amount (Z) from the focus position is shown in FIG. 4. As can be understood from FIG. 4, the transparent cell can be grasped by changing the defocus amount.

On the other hand, since the fluorescence image is generated based on the emission from the cell, high quality information can be obtained by imaging at the focal position. Therefore, when the subject 2 is imaged using the light from the second light irradiation unit 4, it is preferable to image at the in-focus position. Therefore, it is preferable to acquire the defocus image when the first light irradiation unit 3 is used and acquire the in-focus image when the second light irradiation unit 4 is used, and it is necessary to change the optical path length when acquiring both images.

In the present disclosure, the optical path length adjusting unit 7 is provided as a means for changing the optical path length. As the optical path length adjusting unit 7, there is a method for changing the distance between the imaging lens 5 and the subject 2, and in this case, a single-axis stage for moving the installation table 1 and a single-axis stage for moving the imaging unit 6 and the imaging lens 5 can be used. In the case where the second light irradiation unit 4 irradiates the subject 2 with the light obliquely as shown in FIG. 1, the irradiated surface is shifted when the installation table 1 is moved. Therefore, in the case where the installation table 1 is moved, it is preferable to move the second light irradiation unit 4 in the same direction in synchronization with the installation table 1 in order to maintain the light irradiation condition. With this configuration, the light irradiation condition in the imaging area of the subject does not change even when the optical path length is changed. A manual stage or an electric stage can be used for the single-axis stage described here.

Figure 5:
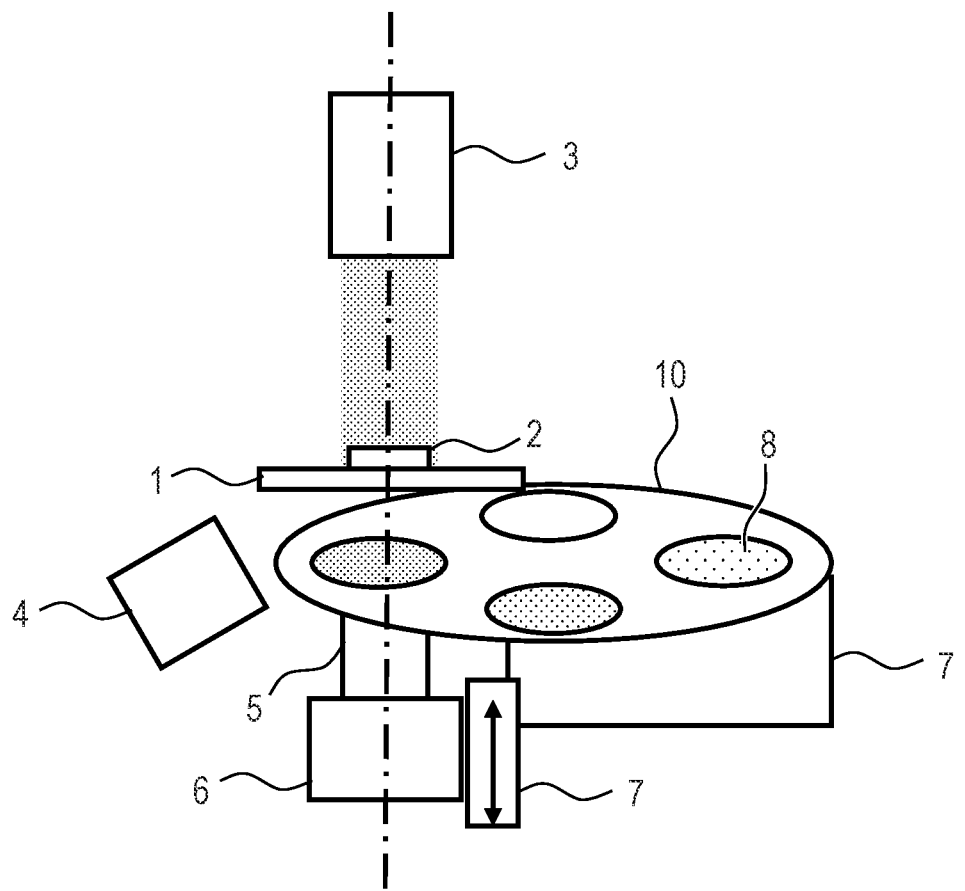
FIG. 5 shows a schematic configuration of an image acquisition apparatus according to a first embodiment of the present disclosure.

It is also effective to insert a member having a different refractive index between the imaging lens 5 and the subject 2 as the optical path length adjusting unit 7. FIG. 5 shows an example of such a configuration in which a turret type filter exchange unit 10 is provided for the fluorescence filter 8, and a plurality of fluorescence filters can be selected using the filter exchange unit 10. In the configuration illustrated in FIG. 5, when the excitation light from the second light irradiation unit 4 is used, the focus is set to be on the subject 2 while the corresponding fluorescence filter 8 is set. In this case, it is preferable to use the single-axis stage described above for the focus adjustment.

In such a configuration, when the second light irradiation unit 4 is used, the subject 2 is imaged in the in-focus state using the fluorescence filter 8. When the first light irradiation unit 3 is used, the filter exchange unit 10 is driven, and the defocus state is obtained by exchanging the filter to a filter having no fluorescence character or a different optical path length from that of the fluorescence filter 8 in a case of using the second light irradiation unit 4. As a result, switching between the in-focus state and the defocus state can be realized only by driving the filter exchange unit 10 without the need to move the subject 2 or the imaging unit 6, and the fear of positional deviation of the observation object at the time of changing the focus state is reduced.

(Image Processing Unit)

When the optical path length adjusting unit 7 changes the optical path length in parallel with the optical axis of the imaging lens 5, since the telecentric lens is used, the size and position of the image do not change. Therefore, the positions of the defocus image and the in-focus image correspond to each other, and the superposition of both images can be performed easily. For example, by superimposing the defocus image (morphological image) obtained by using the first light irradiation unit 3 and the in-focus image obtained by using the excitation light from the second light irradiation unit 4, the cell evaluation can be performed. The image processing unit 22 performs the superposition or composing processing. In addition to the superposition, the image processing unit 22 may calculate the ratio of cells having characteristics by counting the number of cells in the defocus image and counting the number of cells showing fluorescence characteristics in the in-focus image. The contents of the processing executed by the image processing unit 22 are not limited to these, but can deal with anything analyzed using the in-focus image and the defocus image.

In the above system, the control of the light sources of both light irradiation units and the control of the imaging unit 6 may be performed in conjunction with each other. In addition, when an electric stage is adopted for the optical path length adjusting unit 7 and the XY stage attached to the installation table 1, these may also be in conjunction with each other.

It is also effective for simplifying the system to combine the light source control unit and the imaging control unit of both light irradiation units and the controller of the electric stage. In this case, it is preferable to provide a device that sufficiently radiates heat.

(Automatic Processing Unit)

In the characteristic evaluation of many cells, the measurement procedure is often predetermined, and the predetermined processing is often performed after the imaging position is determined. In this case, the automatic execution of defocus image acquisition, in-focus image acquisition, and image processing by a predetermined algorithm is effective for improving the efficiency of data acquisition work. In the present disclosure, for example, the imaging control unit 6a executes these series of processes.

In the present disclosure, for example, the subject 2 is mounted on the installation table 1, the imaging position is determined, and the automatic processing is started by an imaging start switch or the like (not shown). After the automatic processing is started, the first light irradiation unit 3 is turned on, the position of the imaging unit 6 is adjusted to the defocus position by the optical path length adjusting unit 7, and the defocus image is acquired. Thereafter, the first light irradiation unit 3 is turned off, and the second light irradiation unit 4 is turned on. At the same time, the position of the imaging unit 6 is adjusted to the in-focus position by the optical path length adjusting unit 7, and the in-focus image is acquired. Thereafter, the second light irradiation unit 4 is turned off, and the image processing unit 22 performs superposition processing to compose the acquired defocus image and the in-focus image. After processing, it is also effective to display the processing result on a monitor (not shown). This operation is an example of automatic processing, and the above described processing can be performed in any order. The series of operations executed by the imaging control unit 6a may be stored in the imaging control unit 6a, for example, and automatically executed.

By using the image acquisition apparatus 100 as described above, the characteristics of a cell that is a transparent phase object can be evaluated without using a conventional configuration in which a phase plate is mounted on a lens.

First Embodiment

Next, the configuration of the image acquisition apparatus according to a first embodiment of the present disclosure will be described with reference to the schematic diagram showing the schematic configuration of FIG. 5. In the figure, the same components as the configuration previously described as an embodiment of the present disclosure are, in principle, denoted by the same reference numerals, and the detailed description below will be omitted.

A representative observation object of the present image acquisition apparatus is a cell serving as an example of the transparent phase object described above, and this is the subject 2. In this embodiment, the subject 2 exists as a cell adherently cultured in a 6-well plate for cell culture made of polystyrene, and the cell is further immobilized and stained with a specific fluorescent label. Although TBS (Tris-buffered saline) is injected into the 6-well plate as a drying prevention liquid, the object to be observed may be a floating cell.

In this embodiment, the installation table 1 is provided with an attachment capable of mounting a general purpose 6-well plate (container having six recesses. Hereinafter referred to as a container.). The attachment is provided with a fixing means (e.g., a spring means such as a leaf spring) for pressing the container in the horizontal direction of two axes, and is fixed to the installation table 1 when the container is fitted. The installation table 1 is composed of two members, namely, upper and lower members. The upper member to which the container comes into contact is composed of a wide opening including all six recesses in the center of the container, and the container comes into contact with the member only at the periphery. The lower member has an opening only in the observation area. The upper member can move the container by a horizontal two-axis stage, while the lower member is fixed in the horizontal direction.

The two-axis stage described here employs a manual stage in a rack and pinion configuration, but need not be limited to this stage. In the case of rough movement, a linear guide can be installed in the two-axis direction and the installation table 1 itself can be moved manually, or in the case of slight movement, a micro stage or the like can be used. Moreover, it may be possible to switch between rough movement and slight movement. An automatic stage may be adopted to operate from, for example, a PC which is an external control device. At the time of observation, the concave portion to be observed is moved to the opening of the lower member by the two-axis stage and positioned at the observation position. It should be noted that a container having a different shape, such as a 35 mm disc, can be fixed to the installation table 1 in this embodiment by providing a special attachment.

The first light irradiation unit 3 uses an illumination system that combines a high-brightness LED light source emitting light of which a wavelength is 535 nm, a bundle fiber, and a telecentric lens. In this embodiment, the light emitted from the LED light source is made incident into the bundle fiber, and the incident light is emitted through the telecentric lens attached to an exit end of the bundle fiber, so that the subject 2 can be irradiated with uniform collimated light. The telecentric lens used for the imaging lens 5 is located so as to irradiate the installation table 1 with the light in the vertical direction upwardly. In this embodiment, the telecentric lens having a character of providing an emitted light with a uniform circular light about φ50 mm is employed.

As the imaging unit 6, a commercially available mirrorless 1-lens digital camera equipped with a full-size (36 mm×24 mm) 8 K pixel color CMOS sensor is employed. A commercially available 2× telecentric lens that can be installed in the imaging unit 6 is used for the imaging lens 5 as an imaging telecentric lens. When the digital camera and the imaging telecentric lens have mounts different from another, a conversion adapter may be used. The imaging telecentric lens faces vertically upward so that the position of the opening of the lower member of the installation table 1 can be imaged. The imaging unit 6 and the imaging lens 5 are provided on an electric single-axis stage moving vertically.

A monitor (not shown) is also provided to display an image acquired by a digital camera constituting the imaging unit 6 in real time.

The first light irradiation unit 3 irradiate cells in the 6-well plate (container) with uniform collimated light of which wavelength is 535 nm, in the vertical direction, and the electric single-axis stage moves. At that time, an image acquired by the imaging unit 6 is displayed on a monitor in real time, and a certain area including the cells is enlarged by using the digital zoom and displayed. An image of the cell displayed on the monitor at that time is exemplified in FIG. 4.

As shown in FIG. 4, the image of the cell is not displayed in the case of the focus position, and the image of the cell is displayed when the image is shifted forward or backward from the focus position. According to FIG. 4, it is understood that it is preferable to move the focus position by about 50 μm in this embodiment. In addition, although the light/dark of the displayed image is inverted depending on the direction of shift of the focus position, it is preferable to select one or the other according to the display state of the object to be observed, for example.

A plurality of light sources may be provided for the second light irradiation unit 4, and each light source may be switched to be incident on the second light irradiation unit 4. Light from the plurality of light sources may be multiplexed. In this embodiment, an illumination system combining a high-brightness LED light source emitting a plurality of lights of plural wavelength, including light of a wavelength of 365 nm, a quartz bundle fiber, and a telecentric lens is used. The incident end of the quartz bundle fiber may be branched, and LEDs of respective wavelengths are attached to each incident end. Light source switching and multiplexing are performed by turning the respective LEDs on, or off, and adjusting the amount of light. In this embodiment, a plurality of LEDs are exchangeable at the incident end of the quartz bundle fiber. The telecentric lens is attached at the exit end of the quartz bundle fiber. With this configuration, even when the outgoing light is irradiated obliquely to the subject 2, the light quantity distribution on the irradiation surface becomes uniform. It is also effective to improve the uniformity of the light quantity by inserting a rod lens between the bundle fiber and the telecentric lens. In this embodiment, by inserting the rod lens, the uniform light quantity is obtained in the range of about 15 mm×15 mm.

By irradiating the subject 2 with the light emitted from the second light irradiation unit 4 from a position tilted about 30 degrees or more from the optical axis of the imaging lens 5, the subject 2 is irradiated with the light quantity which is uniform in the range of about 18 mm× about 15 mm. This is a condition that the imaging range of 18 mm×12 mm acquired by the 2× telecentric lens which is the imaging lens 5 and the full-size CMOS sensor can be uniformly irradiated with the light, and the light quantity which is uniform in the imaging range can be obtained.

With regard to the filter provided in front of the imaging unit, the configuration in which the filter can be exchanged to change the wavelength of the transmitted light is preferable, and the exchange can be automatically or manually performed. In the case of manual operation, an operation unit for exchanging is provided outside the housing. The position after exchanging may be fixed. In this embodiment, the turret type filter exchange unit 10 is provided between the subject 2 and the imaging lens 5, so that a plurality of optical filters can be used. Specifically, when the first light irradiation unit 3 is turned on, a filter capable of passing light of which wavelength is 535 nm is selected, and when the second light irradiation unit 4 is turned on, a filter having a wavelength characteristic corresponding to the fluorescence characteristic to be acquired is selected. In this embodiment, for example, when 365 nm light is irradiated, a 400 nm long pass filter is used. FIG. 5 shows a configuration in which four types of optical filters can be exchanged, but it is not necessary to limit the number to four, and it is effective to increase the number of types as necessary.

In this embodiment, the optical path length adjusting unit 7 uses a single-axis stage attached to the imaging unit 6. By driving the single-axis stage, the in-focus and de-focus states of the imaging lens 5 are adjusted. As described above, when filters of different optical path lengths are respectively provided in the filter exchange unit 10, the automatic stage driving the filter exchange unit can also be used as the optical path length adjusting unit 7.

As described above, the image acquisition apparatus according to the present embodiment can acquire physical information such as morphological information and fluorescence information of the cell which is a transparent phase object without using the phase plate on the lens, and can evaluate cell characteristics.

Second Embodiment

Next, the automatic imaging of the image acquisition apparatus according to the second embodiment of the present disclosure will be described. As in the case of the first embodiment, in the figure, the same components as those described in the first embodiment and those described in one embodiment of the present disclosure will, in principle, be denoted by the same reference numerals, and the following detailed description will be omitted.

Figure 6:
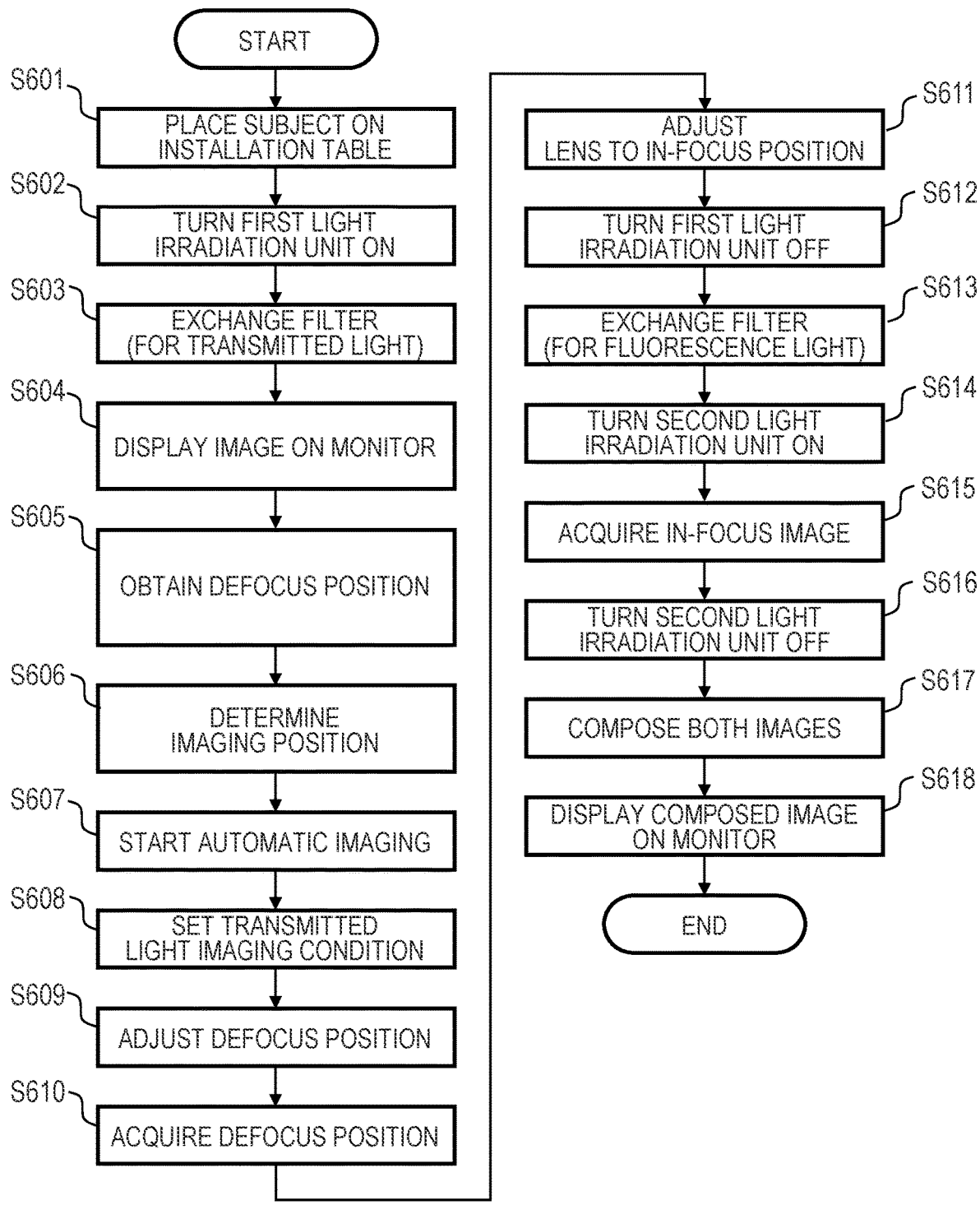
FIG. 6 is a flowchart showing a control flow of an image acquisition system according to a second embodiment.

In the present embodiment, a process of acquiring physical information of the cell which is the transparent phase object, by automatic imaging processing using the image acquisition apparatus shown in FIG. 5 described in the first embodiment will be described with reference to FIG. 6. FIG. 6 is a flowchart showing a system flow related to the physical information acquisition process according to the present embodiment. In the present embodiment, steps S601 to S606 in FIG. 6 are performed by a manual operation, and steps S607 to S618 are automatically performed by the imaging control unit 6a. These automatically performed processes are controlled by an algorithm previously stored in the imaging control unit 6a.

(Manually Executed Processes)

In the physical information acquisition process of the transparent cells, in step S601, the stained cells adherently cultured in a 6-well plate for cell culture made of polystyrene are placed on the installation table 1 as the subject 2 by the operator. After the installation, in step S602, the operator turns the first light irradiation unit 3 on through an input device such as a control panel (not shown) provided in the image acquisition apparatus, and irradiates the subject 2 with collimated light of which wavelength is 535 nm. Then, in step S603, the operator operates the turret type filter exchange unit 10 to arrange a filter (for transmitted light) transmitting 535 nm light at a predetermined position on the imaging optical axis OA of the imaging unit 6.

In the next step S604, the image acquired by the imaging unit 6 is displayed on the monitor (not shown) by the image processing unit 22. In the step S605, the operator, while viewing the image of the subject 2 displayed on the monitor, operates the single-axis stage which is the optical path length adjusting unit 7 so as to adjust the position (defocus position) of the imaging unit, where the morphology of the cell can be seen. After obtaining a suitable defocus position, the operator, in the step S606, operates the two-axis XY stage attached to the installation table 1, moves the subject 2 on the installation table 1, and selects an imaging position while viewing the cell image displayed on the monitor.

(Automatically Executed Process)

After the defocus position is fixed and the imaging position is selected, the operator causes the imaging control unit 6a to execute the process of starting the imaging process in step S607 via the aforementioned input device. More specifically, in this embodiment, the subsequent automatic process is started by selecting the start button on the imaging operation screen displayed on the monitor. When the automatic process is started, the imaging control unit 6a shifts the flow to step S608.

In step S608, the imaging control unit 6a starts the control of each configuration according to the transmitted light imaging condition set as a default. If the flow is correct, the first light irradiation unit 3 lights up to emit light of which wavelength is 535 nm, and the filter for transmitted light is arranged on the imaging optical axis OA of the imaging unit 6 in the filter exchange unit 10. In step S608, the imaging control unit 6a automatically confirms whether or not the image acquisition apparatus corresponds to this condition, and drives these configurations so that the condition is set if it is different from the setting. In step S609, the imaging control unit 6a drives the single-axis stage, which is the optical path length adjusting unit 7, to set the defocus position. If the flow is the same, the focus position is adjusted to the defocus position visually set at this stage, but in this embodiment, automatic adjustment is performed to obtain the defocus position set in advance.

A method of setting the defocus position will now be described. First, the imaging lens 5 is moved backwardly and forwardly along the optical axis direction near the focus position on the optical axis defined from the optical conditions of the imaging lens 5 to acquire an image of the subject 2 at each position. Next, for example, the contrast of the image obtained by the image processing unit 22 is measured, the imaging position of the imaging lens 5 when the image with the lowest contrast is obtained is set as the focus position, and the coordinates on the optical axis at that time are recorded. Thereafter, the single-axis stage is moved by a predetermined amount. In this embodiment, this predetermined amount is set to 50 μm, and the position where the imaging lens 5 is brought closer to the subject 2 by 50 μm from the focus position is set as the defocus position.

After the imaging control unit 6a moves the imaging lens 5 to the defocus position, in step S610, the imaging control unit 6a acquires the defocus image of the subject 2 by the digital camera of the imaging unit 6. After the defocus image acquisition, the imaging control unit 6a shifts the flow to step S611. Subsequently, the imaging control unit 6a drives the single-axis stage in step S611 and moves the imaging lens 5 to the focus position recorded in step S609.

In step S612, the imaging control unit 6a turns the first light irradiation unit 3 off, and in step S613, the filter exchange unit 10 is operated to arrange the fluorescence filter 8 corresponding to light emitted from the second light irradiation unit 4 on the imaging optical axis OA of the imaging unit 6. In this embodiment, the thickness of the fluorescence filter 8 and the transmitted light filter is the same as 2 mm, and the same glass material is used. Therefore, the optical path length does not change even if the filter is exchanged.

Immediately after the second light irradiation unit 4 is turned on in step S614, the imaging control unit 6*a* acquires a fluorescent image of the subject 2 by the digital camera of the imaging unit 6 in step S615. Thereafter, the imaging control unit 6*a* turns the second light irradiation unit 4 off in step S616. Thus, by shortening the lighting time of the second light irradiation unit 4, optical damage to the subject 2 can be reduced as much as possible.

After the second light irradiation unit 4 turns off, the imaging control unit 6*a* shifts the flow to step S617. In step S617, the image processing unit 22 executes a process of superimposing or composing the defocus image acquired in step S610 and the in-focus image acquired in step S615. The image generated by the superimposing process is displayed on the monitor (not shown) in step S618, and the imaging control unit 6*a* terminates the series of imaging processes.

As described above, in this embodiment, the imaging position is set manually by the operator. After that, the first light irradiation unit 3 and the second light irradiation unit 4 are appropriately turned on by the imaging control unit 6*a*, the defocus image and the in-focus image of the subject 2 are automatically acquired, and the generation of the superimposed or composed image and the displaying the composed image on the monitor are automatically performed. As a result, the physical information such as the morphological information and the fluorescence information of the cell which is the transparent phase object can be easily acquired without mounting the phase plate on the lens, and the cell characteristics can be evaluated.

The present embodiment describes an example of a method for setting or acquiring a defocus image and an in-focus image acquired by automatic processing. That is, the order of acquisition and processing of both images, the filter (for fluorescence) conditions and the number of images acquired at the timing of imaging the in-focus image, and the image processing conditions can be appropriately changed according to the protocol to be implemented.

As described above, the image acquisition apparatus according to one aspect of the present disclosure acquires the image of the subject 2 of the transparent phase object. The image acquisition apparatus includes the first light irradiation unit 3, the second light irradiation unit 4, the imaging unit 6, and the optical path length adjusting unit 7. The first light irradiation unit 3 irradiates the subject 2 with the parallel light (substantially parallel light) which is the first light, by using, for example, the collimator. The second light irradiation unit 4 irradiates the subject 2 with the second light (for example, the excitation light) at the incident angle different from that of the first light irradiation unit 3. The imaging unit 6 includes the telecentric lens (imaging lens) 5 as the telecentric optical system, and images the subject 2 irradiated with the first light and the second light through the telecentric lens 5. The imaging unit 6 has the imaging optical axis OA parallel to the optical path of the first light irradiation unit 3, and is arranged on the imaging optical axis OA opposite to the first light irradiation unit 3 with respect to the subject 2. By controlling the position of the imaging lens 5 on the imaging optical axis OA, the optical path length adjusting unit 7 can control the focus state of the subject 2 to be in-focus or defocus. With the above configuration, even when the digital camera using the high-pixel imaging element is used, it is possible to acquire information on the morphology and physical characteristics of the minute and transparent phase object by digitally zooming the acquired image.

The image acquisition apparatus described above is further provided with the image processing unit 22 for composing the defocus image acquired when the first light is irradiated and the in-focus image acquired when the second light is irradiated. By acquiring the defocus image and the in-focus image by the telecentric optical system, the composing of these images can be easily performed. In addition, for example, excitation light may be used for the second light in order to obtain physical characteristics such as fluorescence characteristics of transparent cells, and the imaging unit 6 may image the fluorescence image of the subject 2.

In the image acquisition apparatus described above, the telecentric optical system (imaging lens 5) may have the optical path changing unit that changes the optical path so that the optical path of the second light is parallel to the imaging optical axis OA of the imaging unit 6. In the embodiment described above, the dichroic mirror 9 is used as the optical path changing unit, but if the same effect is obtained, the aspect of the optical path changing unit is not limited to this. In this embodiment, the second light irradiation unit 4 may irradiate the dichroic mirror 9 with a second light. If there is no such an optical path change unit, the second light irradiation unit 4 may be disposed on the same side as the imaging unit 6 with respect to the subject 2, and may irradiate the second light from the side opposite to the first light.

Furthermore, in the image acquisition apparatus described above, the optical path length adjusting unit 7 may control the position of the imaging lens 5 so that the irradiation area of the second light to the subject 2 does not deviate from the imaging area. In the case where the second light is irradiated obliquely to the subject 2 as in the example shown in FIG. 1, for example, when only the installation table 1 is moved for focusing, the irradiated area is shifted, and the fluorescence image at the desired position cannot be obtained. By performing such control described above, the fluorescence image at the desired position can always be obtained. In the present disclosure, as a specific control, the optical path length adjusting unit 7 controls the position of the imaging lens 5 or the distance between the imaging lens 5 and the subject 2 while keeping the positional relationship between the subject 2 (installation table 1) and the second light emitting part of the second light irradiation unit 4 constant. However, if it is possible to keep the above-mentioned irradiation area within the imaging area, for example, the embodiment is not limited to the disclosed example. The subject 2, such as a transparent cell, can be housed in the container of which the upper surface and the lower surface disposed substantially perpendicular to the imaging optical axis OA of the imaging unit 6 are transparent to the first light and the second light.

In addition, the present disclosure can constitute the image acquisition method in which the subject 2 is irradiated with the first light from the first light irradiation unit 3, the subject 2 is irradiated with the second light from the second light irradiation unit 4, and the image of the subject 2 is acquired via the telecentric optical system. In the image acquisition method, the defocus image of the subject 2 is acquired in the defocus state using the first light, and the in-focus image of the subject 2 is acquired in the in-focus state using the second light. Then, the image processing unit 22 generates the composed image using the defocus image and the in-focus image. By carrying out the above method, it is possible to evaluate character of the minute cell which is the transparent phase object by a simpler configuration without a ring slit or a phase plate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167781, filed Oct. 19, 2022, which is hereby incorporated by reference herein in its entirety.

What is claimed is:

1. An image acquisition apparatus for acquiring an image of a subject which is a phase object, the image acquisition apparatus comprising:
a first light irradiation unit including a light source and a collimator which changes light irradiated from the light source into a collimated light, the first light irradiation unit being configured to irradiate the subject with the collimated light which is a first light;
a second light irradiation unit configured to irradiate the subject with a second light at an incident angle different from that of the first light irradiation unit;
an imaging lens comprising a telecentric optical system; and
an imaging unit using the imaging lens, the imaging unit being configured to image the subject to which at least one of the first light and the second light is irradiated,
wherein an optical axis of the imaging lens is parallel to an optical path of the first light irradiation unit,
wherein the imaging unit is disposed opposite to the first light irradiation unit with respect to the subject, on the optical axis, and
wherein an optical path length adjusting unit configured to control a distance between the telecentric optical system and the subject, on the optical axis, is provided.

2. The image acquisition apparatus according to claim 1, further comprising an image processing unit configured to compose (1) a defocus image of the subject acquired upon irradiation with the first light and (2) an in-focus image of the subject acquired upon irradiation with the second light.

3. The image acquisition apparatus according to claim 2, wherein the second light is used for acquiring a fluorescence image of the subject.

4. The image acquisition apparatus according to claim 1, wherein the second light irradiation unit is disposed on the same side as a side of the imaging unit with respect to the subject.

5. The image acquisition apparatus according to claim 4, further comprising an optical path changing unit configured to change an optical path of the second light so as to be parallel to the optical axis,
wherein the second light irradiation unit irradiates the second light to the optical path changing unit.

6. The image acquisition apparatus according to claim 1, wherein the optical path length adjusting unit controls a position of the telecentric optical system while keeping a positional relationship between the subject and an emission portion of the second light in the second light irradiation unit, constant.

7. The image acquisition apparatus according to claim 1, wherein the subject is housed in a container in which the upper and lower surfaces arranged substantially perpendicular to the optical axis are transparent to the first light, the second light, and fluorescence light from the subject.

8. The image acquisition apparatus according to claim 1, wherein the collimator included in the first light irradiation unit includes a telecentric lens.

9. The image acquisition apparatus according to claim 1, wherein the second light is a collimated light.

10. The image acquisition apparatus according to claim 1, wherein the second light irradiation unit includes a second light source and a second collimator which changes light irradiated from the second light source into a collimated light which is the second light.

11. The image acquisition apparatus according to claim 1, wherein the telecentric optical system included in the imaging lens is a telecentric lens.

12. The image acquisition apparatus according to claim 1, wherein the phase object is a cell.

13. The image acquisition apparatus according to claim 1, wherein the optical path length adjusting unit changes a position of the telecentric optical system on the optical axis from an in-focus position of the subject to a predetermined defocus position, and
the imaging unit images the subject when the telecentric optical system is on the predetermined defocus position.

14. An image acquisition method using an image acquisition apparatus, the image acquisition apparatus comprising (1) a first light irradiation unit including a light source and a collimator which changes light irradiated from the light source into a collimated light, the first light irradiation unit being configured to irradiate a subject which is a phase object with the collimated light which is a first light; (2) a second light irradiation unit configured to irradiate the subject with a second light at an incident angle different from that of the first light irradiation unit; (3) an imaging lens comprising a telecentric optical system; and (4) an imaging unit using the imaging lens, the imaging unit being configured to image the subject to which at least one of the first light and the second light is irradiated, the method comprising the steps of:

imaging a defocus image of the subject in a defocus state using the first light;

imaging an in-focus image of the subject in an in-focus state using the second light; and generating a composite image using the defocus image and the in-focus image.

15. A non-transitory tangible medium having recorded thereon a program for causing a computer to perform the image acquisition method according to claim 14.

16. An image acquisition apparatus for acquiring an image of a subject which is a phase object, the image acquisition apparatus comprising:

a first light irradiation unit including a light source and a collimator which changes light irradiated from the light source into a collimated light, the first light irradiation unit being configured to irradiate the subject with the collimated light which is a first light;

an imaging lens comprising a telecentric optical system; and an imaging unit using the imaging lens, the imaging unit being configured to image the subject to which the first light is irradiated, wherein an optical axis of the imaging lens is parallel to an optical path of the first light irradiation unit, wherein the imaging unit is disposed opposite to the first light irradiation unit with respect to the subject, on the optical axis, wherein an optical path length adjusting unit configured to control a positional relation between the telecentric optical system and the subject, from an in-focus positional relation to a predetermined defocus positional relation on the optical axis, is provided, and wherein the imaging unit images the subject when the telecentric optical system is in the predetermined defocus positional relation.

\* \* \* \* \*